United States Patent [19]
Wilson

[11] Patent Number: 6,030,483
[45] Date of Patent: Feb. 29, 2000

[54] METHOD OF FORMING LAMINATES USING A TESSELLATED CORE

[76] Inventor: Graeme Paul Wilson, 3 Edgbaston Drive, Westville Kwa Zulu Natal, South Africa

[21] Appl. No.: 08/917,547

[22] Filed: Aug. 26, 1997

[30] Foreign Application Priority Data

Sep. 10, 1996 [ZA] South Africa ............................ 96/7244

[51] Int. Cl.[7] .................................................... B32B 3/12
[52] U.S. Cl. ....................... 156/292; 52/783.1; 156/290; 428/117
[58] Field of Search ..................................... 428/140, 137, 428/114; 156/290, 292; 52/783.1, 789.1, 796.1

[56] References Cited

U.S. PATENT DOCUMENTS

| | | | |
|---|---|---|---|
| 3,841,958 | 10/1974 | Delorme | 428/117 |
| 4,229,473 | 10/1980 | Elber | 428/140 X |
| 5,288,547 | 2/1994 | Elmes et al. | |
| 5,500,272 | 3/1996 | Padden | 428/140 X |

*Primary Examiner*—Jeff H. Aftergut
*Attorney, Agent, or Firm*—Young & Thompson

[57] ABSTRACT

A method of forming a laminate for construction units and particularly laminates of fiber reinforced plastic, includes the step of locating a core between a pair of laminas, the core including a plurality of transverse openings such as a tesselated structure joined at intersections, permitting passage of an adhesive therethrough for joining the laminas. The core is of a lightweight very inexpensive material.

5 Claims, 1 Drawing Sheet

METHOD OF FORMING LAMINATES USING A TESSELLATED CORE

FIELD OF THE INVENTION

This invention relates to laminates. In particular to glass-fibre reinforced plastic (GRP) laminates as well as laminates manufactured by placing layer on layer of various materials which are allowed to set, cure, or harden to a given shape. In addition to laminates this invention can be used to introduce a low density core to cast materials.

BACKGROUND OF THE INVENTION

G.R.P. laminates (sometimes referred to as F.R.P.—fibre reinforced plastic laminates) have a high tensile strength to weight ratio but lack adequate rigidity. Therefore G.R.P. articles are often designed with corrugations, compound curves or ribs as an integral part of the finished product in an effort to improve stiffness. However this is frequently not feasible or desirable. The simplest method to overcome the lack of stiffness is to increase laminate thickness by adding extra layers of the same material to form a solid structure. This method is however expensive and adds extra weight to the finished product.

Another way to improve stiffness of a laminate is to use sandwich core construction. The principle is to divide the laminate into two skins which are positioned apart by adding a core material between them. To be effective the core must form a link between the two skins. This forms a much stiffer laminate than if the two skins are side by side in a single laminate. Many different materials are used for cores in various forms. These can be wood, plastic foams, non-woven fabrics, woven 3 dimensional fabrics, cardboard etc. or preformed honeycombs made from paper, plastic, metal and other materials.

Usually the cores are added during the laminating process. Typically the outer skin of the laminate is first laid up in a mould. The core material is then bonded to this, often by setting or bedding it in a layer of wet resin or adhesive. The second or inner skin is then bonded by laminating over the core material.

Occasionally in the G.R.P. industry, the two skins can be moulded separately. The core is then bonded and/or mechanically fastened in place between the two skins.

The cores add varying degrees of structural strength to a laminate in addition to spacing the two skins apart. For the sandwich construction to be effective, there has to be at least a certain degree of structural support provided by the core material. The design aspects of core construction are quite complex but generally the core must be strong enough to hold the two skins in position relative to each other. The core material must have adequate structural strength and be bonded well to the G.R.P. skins so that the sandwich core laminate acts as a single structural unit.

There are several problems associated with sandwich laminates. One of these is low shear strength, especially when using low density core materials that have little structural strength.

Another problem is in fastening other components or fittings to the sandwich laminate. This can cause the two skins to pull apart (delaminate) from the core or squeeze together and crush the core material. There are various methods to overcome this problem which can be costly and/or time consuming.

Not only do core materials add stiffness to a laminate, they also improve noise and thermal insulation as well as provide buoyancy in certain instances.

In more recent times environmental groups have put pressure on the GRP industry to reduce or eliminate solvent emissions during production of laminates. This has forced GRP moulders in certain countries to change production methods from the usual open moulded, hand lay-up technique to an automated or semi-automated closed mould system. Closed mould procedures entail placing dry glass-fibre reinforcements between a male and female mould. Resin is then fed under pressure and/or vacuum into the cavity between the two moulds. Once the cavity is full and the reinforcement has been saturated the moulding is allowed to cure before stripping and repeating the process. Sandwich cores used in this process are usually specialised, expensive and consume more resin than their open moulded equivalents resulting in heavier laminates.

The Desirable Properties of a Sandwich Core are Described as Follows:

1. Reduce cost and weight whilst maintaining or improving stiffness when compared to a conventional solid laminate of equivalent thickness.
2. Bond strength between outer skins and sandwich core must be capable of transfering shear forces from the skins to the core without any sign of parting or breaking away at the interface.
3. The integral strength of the core should readily withstand the designed end-use stresses and strains i.e.: The material from which the sandwich core is made should not crack, crumble or breakdown within itself under load.
4. The core should be resistant to crushing.
5. The core should support the outer skins in such a way that it prevents or limits buckling under load.
6. The core should be resistant to fatigue.
7. Be stable and compatible with other materials used in the construction of the laminate.
8. Readily drape over simple and compound curved shapes.
9. Have no detrimental effect on the aesthetic appearance on the surface of the product.
10. Core application should not be complicated or time consuming.
11. Be resistant to water and/or chemical degradation in the event of damage to an outer skin.
12. Have good acoustic and thermal insulation properties as well as remain stable at elevated temperatures.
13. Be compatible with existing hand and mechanical processing techniques.
14. Tailoring should not be difficult or require specialised equipment.

Few, if any, existing sandwich core materials can comply with all the above requirements.

Prior Art Arrangements
Core Materials Typically Used
1) Non-Wovens

A foam is introduced into a non-woven material which is saturated in situ or pre-saturated with a liquid resin which then cures to its moulded shape. The sheet of non-woven can be perforated to assist with absorption of the resin. Alternatively, for closed mould applications, the material can be lightly embossed with a honeycomb type pattern which leaves a network of small channels across the top and bottom surfaces of the non-woven material through which resin flows in order to speed up the absorption process. This system is user friendly but costly and heavy by comparison to other available technologies.

2) Microballoon or Microsphere Paste

Microscopic hollow balloons made from glass, ceramic, plastic etc are blended with a resin to form a lightweight paste (sometimes referred to as a polymer concrete) that can be troweled in place. This system is fairly easy to use and forms an excellent core material. It is however expensive and difficult to produce a core of uniform thickness and therefore stiffness.

3) Foamed Plastic

Polystyrene, polyurethane and polyvinyl chloride (PVC) in foamed form are frequently used as core materials and are available in various densities and thicknesses. Generally the higher the density, the stronger the foam with a corresponding increase in price.

Polystyrene foam is sometimes used because of its low cost but is subject to chemical attack from a wide range of solvents making its unsuitable for most applications unless it is protected with a suitable barrier coat. It is not viable to use this product in most instances. Polyurethane foam is frequently used as a sandwich core material or a forming core where stiffening ribs are bonded onto laminates. This material also has excellent insulation properties. However the product is friable (apt to crumble) and can break down within itself under cyclic loading.

Polystyrene and polyurethane foams are usually supplied in pre-cured blocks or sheets. In this form they are obviously limited to flat or almost flat laminates. Polyurethane can be foamed in-situ between two pre-moulded laminates. This system has its limitations and is not widely used. Polystyrene and polyurethane foams both absorb water in the event of damage of the protective outer skins.

PVC foam is a closed cell material which is not absorbent, is considerably more expensive than polystyrene and polyurethane but offers many advantages that are important for certain applications. Like both previous foams mentioned it will not readily drape over complex shapes. To overcome this problem the PVC foam is cut into small blocks and bonded on one surface to a light, open weave fabric. These sheets of individual blocks can then be draped over gentle curves.

One of the difficulties of all pre-cured plastic foam cores is to ensure 100% contact with the first laminate to which the foam is bonded, it is very difficult to detect air voids trapped at the interface of the bonding surfaces. Sometimes a vacuum bag (or weight) is used to solve the problem. Several proprietary adhesives have been developed to improve the bond between the foam core and outer skins. When the foam is supplied in its drapable block form, the adhesive will migrate through the vertical cuts between each block thereby eliminate any voids and improve the integrity of the laminate.

End Grain Balsa Wood

Sheets of end-grain balsa wood are sometimes used as a core material for sandwich construction. The end-grain structure is used so that the resin or adhesive can penetrate the balsa and therefore improve adhesion to both outer skins. Like PVC foams, end grain balsa is available in blocks held together in sheet form with a gauzelike backing to improve drapability. Although balsa cores have many excellent properties, it absorbs water and is expensive.

Honeycomb Sandwich Cores

There are several pre-formed honeycomb cell core materials available to the GRP industry. One of these is a special honeycomb material made from a treated paper. It is used to form a honeycomb structure that produces an exceptionally light core between two layers of fibreglass. The honeycomb cell paper contours to compound curves.

Honeycomb cores can also be formed from metal, plastic and other materials. These cores are difficult to fabricate and bond to fibreglass laminates. While honeycomb cores find some use in manufactured products, they are not generally used except where exceptional weight savings are critical typically in aerospace and aircraft applications. Most are limited to pre-formed flat panels and cannot be moulded as readily (or at all) as other available core products. In addition to these difficulties, honeycomb cores suffer from delamination problems primarily due to the very limited bonding interface between the tin vertical cell walls and the outer skins. Another problem is that the usually thin honeycomb cells walls have limited resistance to crushing. For this reason a plastic foam can be used to fill each cell thereby supporting the cell walls. This filled cell system increases its resistance to crushing and increases the surface area to which the outer skins are bonded. Of all core materials available, honeycombs generally fall into the most expensive and problematic category hence their limited use.

Three examples of honeycomb cores have been located n an international novelty search.

In EPO 0 628 406 A2 a preformed structure 3 is joined to a surface 1 by means of foaming adhesive 2 to provide a strength for the surface when subjected to localised compressive loads.

U.S. Pat. No. 4,859,517 has a core 12 of pre-manufactured honeycomb construction and skin panels 14 and 16 are adhered thereto, one of the panels being porous and therefore somewhat flexible so that bending of the honeycomb can take place before the adhesive bonds fail.

French Patent 2 171 949 relates to the use of a pre-manufactured honeycomb core to which extends a short distance into the honeycomb from each side.

Other Core Materials and Systems

The aforementioned cores materials and systems are the most commonly used but there are many other possibilities provided they are compatible with the resins and chemicals used during the manufacture of a laminate. In one of the earlier sandwich core systems, a layer of adhesive paste was applied to the first skin. Before the paste was allowed to harden, a series of small, absorbent blocks were pressed individually into the adhesive forming a mosaic of blocks over the required area. During this process the adhesive paste was forced to rise around each block thereby sealing all the gaps between each individual "cell". The second skin was then laminated over the core which bonded well to both the adhesive and individual blocks. The system resulted in an extremely rigid laminate albeit heavy, labour intensive and expensive.

It is an object of the present invention to provide a method of forming an inexpensive and lightweight sandwich core which has adequate strength; and which meets all or most the requirements listed under the heading "Desirable properties of a sandwich core mdterial".

DESCRIPTION OF THE PREFERRED EMBODIMENTS

According to the invention a method of forming a laminate includes the step of locating a core between laminas, the core including a plurality of transverse openings permitting passage of an adhesive composition therethrough for joining the laminas.

It is believed that the concept is to cover each individual cell with a coating which hardens after a period. Once the coating was hardened it forms a hard shell around each cell. It is essential that the coating be strong and tough as well as adhere to both outer skins. Each cell is positioned so as to create a tesselated sheet.

In a preferred form of the invention the passages are in the form of a pattern. A honeycomb pattern has been found to be very suitable and this may be formed by cutting the core in honeycomb formations joined at intersections. Thus, in one example of the invention each honeycomb comprises six triangles each one joined to its neighbours at its angles.

The core should be a material which is inexpensive, and may be chosen from recycled material. In order that the core is able to follow curved surfaces, it could be chosen from a flexible material and several foamed polymeric materials offer themselves ideally for this purpose.

It will be appreciated that the core need have only very little strength as it serves merely to provide means for forming a pattern for joining the laminas. In fact, if it were possible, which it is not, the core could be removed without sacrificing strength of the laminate.

The adhesive useful in the present invention is chosen from any suitable polymeric material which is compatible with the laminas. A particularly useful adhesive for this purpose is a compound known as polymer concrete or mortar which is a filled resin system. Typical examples of fillers are calcium carbonate, wollastonite, microspheres, sand, sawdust, fibrous powders, or granules, and the like.

The invention also includes laminates manufactured according to the above method.

In an example of the invention, two basic components which are combined to form a strong, light weight honeycomb core sandwich material of even thickness which can be cast in situ over complex shapes.

The two components may be as follows:
a) Core template—A tesselated low density foamlike material in sheet form, resulting in a mosaic of interconnected tessera or cells with a uniform void surrounding each shape.
b) Core paste—A flowable low density compound with adhesive properties which will readily bond with both outer skins of a laminate which will cure, set or harden after a period into a dense foam or solid.

Figure 1:
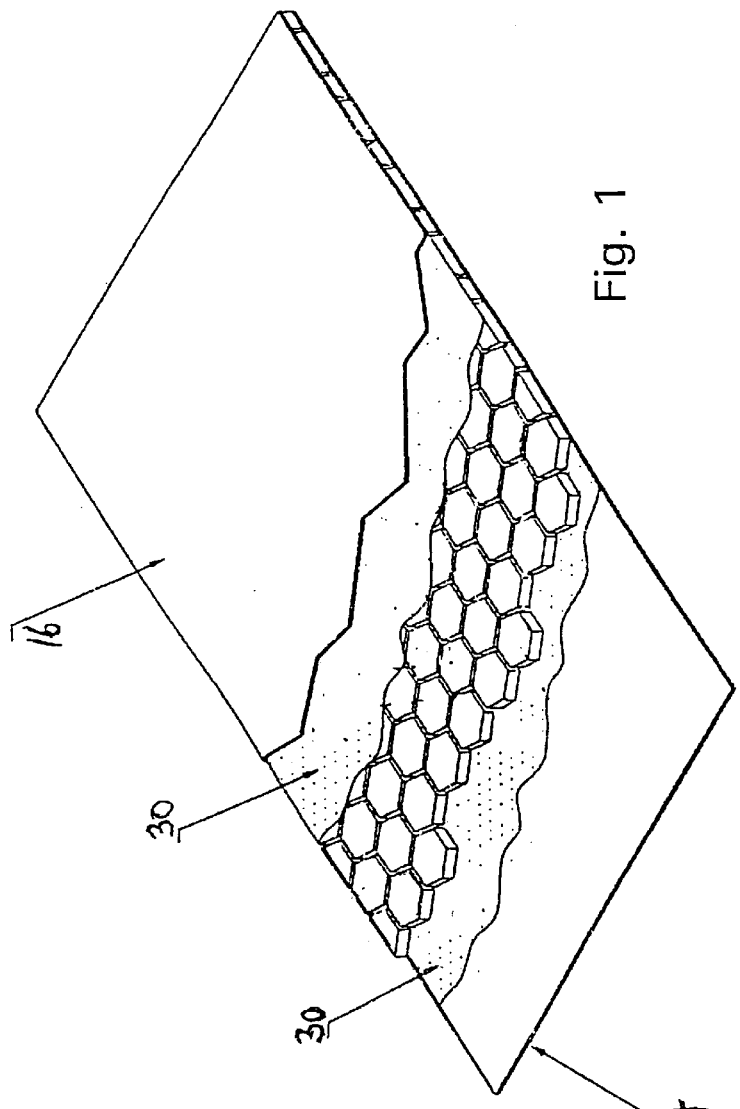
FIG. 1 is a partial cut-away illustration of an embodiment of the laminate of the present invention.
Figure 2:
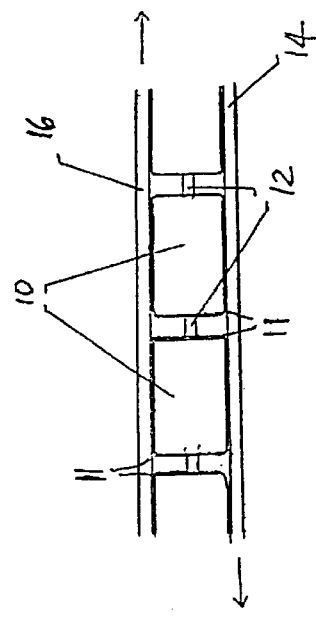
FIG. 2 is a partial cross-section of the embodiment of FIG. 1.

Core template:

With reference now to FIGS. 1 and 2, a low density sheet is cut, moulded or formed into tessera 10 (one of the small pieces of which a mosaic is made). Each tessera is connected to its neighbour via a thin flexible link 12 situated at regular intervals throughout the sheet. It is an important feature that each link is situated in the center of the core template. This will improve its draping properties and eliminate interference of the bond interface between the core paste and outer skins 14,16. It is also located in an area where the least amount of shear strength is required. The template serves no structural purpose. Its only function is to form the core paste into a series of honeycomb cells.

Besides holding all the tessera 10 together in a continuous sheet, the links 12 must also act as spacers which hold the tessera apart at set intervals thereby creating a constant, even gap between each tessera (or cell) and its neighbour.

The tessera or cells can be of any geometric shape be they square, round, triangular, hexagonal etc. The principle of the spacer/link remains the same irrespective of the cell shape.

The top and bottom edges of each cell 10 are rounded as shown by reference 11. This feature increases the surface contact area between the core paste and outer skins thereby increasing its resistance to delamination.

Core paste:

This can be a filled or unfilled plastic, liquid foam or any flowable material which cures, sets, or hardens after a period to form a tough shell around each cell and bond readily with both outer skins. Unlike existing sandwich core materials, there is no requirement for any material used in the construction of the laminate to bond with the core of the sandwich core system of the present invention. Should there be adhesion between the paste and the cell material it will be by accident rather than design. If fillers are used in the core paste they can be microspheres (to reduce weight) combined with a fibrous filler which increases strength and often adhesive properties. Once the core paste hardens it forms the only link between the two outer skins and must therefore have good tensile properties to endure the stresses and strains the end product is designed to withstand.

Moulding procedures:

Open or contact moulding:

The core paste is sprayed, brushed, rolled or troweled onto the first skin 14. Whilst it is still in a flowable state, the core template is pressed or bedded into the core paste with mild (hand) pressure. The application of pressure will cause the core paste to coat the bottom face of each cell and flow up through the openings surrounding each cell thus creating an interconnected web of core paste between each cell across the surface of the first skin.

Any excess core paste, flowing through the gaps between the cells is simply scraped off and troweled back into areas where channels have been under-filled. Once all the cells have been completely coated and all voids between each cell filled with core paste, the second skin 16 is then laminated over the core.

Once the core paste has hardened, cured or set, it will form a strong interconnected lightweight honeycomb web which bonds to both outer skins. At this stage the core template former serves no further structural purpose other than to eliminate air collecting in each cell which would expand or contract under varying thermal conditions. Excessive expansion or contraction within each cell could result in unsightly blisters or indentations resembling the shape of the cells forming on the exterior surface of the product.

The core paste in a viscous form is suitable for hand laminating techniques. A much thinner version with good flow characteristic is required for closed moulding systems.

Machine Processing Or Closed Moulding Techniques:

As described elsewhere in this specification, closed mould procedures require resin to be pressure-fed into the cavity between two moulds.

When traditional sandwich cores are used in this moulding method it is a very slow, difficult and often complex procedure to guarantee that the cavity is completely filled with resin especially when relatively viscous, filled resins are used (which is a common practice). Due to the interconnected web of small channels created by the core template it is therefore easy for the resin (filled or unfilled) to rapidly flow along this network of channels thereby ensuring that all air voids are forced out of the cavity and impregnation of the laminate is completed quickly and efficiently. Should it be necessary, small channels may be lightly embossed across the top and bottom surfaces of each cell thereby creating an opportunity for the resin to flow across the surface of the cell as well as through the channels between each cell. This will ensure even quicker wet out of the glass fibres in both outer skins.

Fastening External Components to a Sandwich Laminate:

Most traditional core materials can be subject to delamination when external fittings are bonded to a sandwich laminate. Conversely, the core can be crushed when fittings are bolted or riveted through the laminate. With the present invention the problem can be simply overcome by removing small sections of the core template in areas where fittings are required to be fastened. The area where the core template has been removed is then filled with solid core paste which will have outstanding adhesion to both outer skins as well as possessing excellent resistance to crushing. The filled area can be slightly mounded where possible which provides a thicker section if self-tapping screws are used to fasten the fittings. Alternatively, a metal or hardwood plate (or similar) can be embedded in the laminate in the area where the core template has been removed. This is the traditional method of spreading point loadings in sandwich laminates. The principle is not unlike having a large washer built into the laminate which helps to spread any loads applied to the external fitting.

Low Density Core For Cast Polymer Concrete Products:

Cast polymer concrete products such as cultured marble sanitaryware can use the same core template as that used for laminates but with relatively minor modifications. The principle is that each cell will displace its own volume of the surrounding polymer concrete thereby saving weight and cost yet maintain structural integrity. If required, small compressable spacer pads or stiff but compressable non-woven materials (similar to a plastic pot scourer) can be located at regular intervals across both faces of the core template. These appendages will locate and hold the core template in the centre of the void between the matched male and female mould. Polymer concrete is then poured into the mould which flows through and around all the components of the core material. The outside faces of the spacing medium can be coated or tipped with a material compatable with the polymer concrete thus creating a solid, uninterrupted surface on both faces of the cast article. On flat products, half the open mould can be filled with polymer concrete. The core template is then gently bedded into the mixture before being covered with the balance of the polymer concrete thereby creating a hard, tough shell around the lightweight honeycomb core.

FIG. 1 illustrates the eventual construction of the laminate which comprises the two sheets 14,15 joined with the adhesive (for example polymer concrete) 30 extending through the core, which, by virtue of its low density, forms a lightweight major volume of the space between the sheets.

I claim:

1. A method of forming a laminate, comprising the steps of:

positioning a core on a first lamina, the core being a tessellated sheet of material having a width and comprising separate shapes that are each connected to adjacent shapes by links of the material, the shapes being separated from each other by an interconnected web of channels that extends transversely across a surface of the first lamina, wherein each of the links is spaced from widthwise opposing surfaces of the respective shapes to avoid obstructing the channels; and applying an adhesive to the core so that the adhesive flows widthwise through the core and transversely through the channels; and joining a second lamina to the first lamina, with the core therebetween, using the adhesive.

2. The method of claim 1, wherein the links are about midway widthwise between the opposite surfaces of the respective shapes.

3. The method of claim 1, wherein the tessellated sheet is a foamed polymeric material.

4. The method of claim 1, wherein the adhesive is a flowable polymeric material.

5. The method of claim 1, wherein the shapes are one of square, round, triangular, and hexagonal.

* * * * *